Dec. 30, 1930.    V. WEISS    1,787,182

LOOM PICKER

Filed April 15, 1929

Inventor:
Valentin Weiss

Patented Dec. 30, 1930

1,787,182

UNITED STATES PATENT OFFICE

VALENTIN WEISS, OF BERLIN-WEISSENSEE, GERMANY, ASSIGNOR TO THE FIRM JAROSLAWS ERSTE GLIMMERWARENFABRIK, OF BERLIN, GERMANY

LOOM PICKER

Application filed April 15, 1929, Serial No. 355,019, and in Germany April 20, 1928.

My invention relates to loom pickers which consist of layers of fibrous material, preferably woven cloth, united together to form a laminated body, and also relates to the manufacture thereof.

According to the invention the picker consists of a laminated body in which layers of fibrous material which have been coated on one or both sides with artificial resin before being united together and which may be more or less impregnated with artificial resin (hereinafter these layers will be referred to as "treated layers") alternate in a predetermined sequence with layers of fibrous material which have not been previously treated with artificial resin (hereinafter these layers will be referred to as "raw layers"). Every treated fibrous layer is thus united by the artificial resin with its adjacent treated or raw fibrous layer.

The fibrous layers may be made of paper, but they preferably consist of textile fibers and more especially of woven cloth.

The artificial resin is preferably a compound capable of being hardened, more particularly a condensation product of phenolformaldehyde, and it is present in the finished body in a wholly or partially hardened condition.

Where treated and raw fibrous layers are juxtaposed to one another, the treated layers impart some of the artificial resin to the surface of the raw layers, but the latter remain free from artificial resin in the center. Also raw layers juxtaposed to one another do not receive any artificial resin, and the raw layers thus retain their natural pliability.

The sequence of the layers may, for example, be so selected that each raw layer is followed by a layer treated on both sides, in which case all the layers are caused to adhere together by the artificial resin. There may however be strata consisting of a plurality of treated layers together and strata consisting of a plurality of raw layers together and such strata may alternate with one another in any desired manner as also with strata consisting of both treated and raw layers.

As a treated layer or strata thereof, especially when the artificial resin is in a more or less hardened condition, is firmer, harder and more elastic than a raw layer, or strata of raw layers, whereas, on the other hand, a raw layer or strata is softer, tougher and more pliable than a treated layer, or strata of treated layers, it is possible to so select the sequence of the layers as to give the picker any desired characteristics and to vary these characteristics in different parts by varying the sequence, and thus to adapt the mechanial properties of the picker to the particular wear and tear at different parts of the picker.

This method of manufacturing the pickers has the advantage that only two classes of preliminary product require to be kept in stock, viz, treated fibrous webs and untreated or raw fibrous webs, from which to manufacture pickers of the most varied properties. It has also been found that pickers compounded from treated and raw fibrous webs, particularly cloth, excel in toughness and in gentleness of stroke a picker consisting wholly of treated layers.

The picker or the blank for the same may be made by superposing separate pieces of treated layers, preferably of cloth, cut to a suitable size and also similar pieces of raw layers, preferably of cloth, in the desired sequence to form a pile and uniting the layers together by heating the pile under pressure in a mould or without the use of a mould, whereupon the body so obtained is further shaped by pressure and heat or by machinery if necessary or by both of these methods. When an artificial resin capable of hardening is used, it can be hardened to the desired degree when the aforesaid heat and pressure are employed, or later in a separate operation.

In the preferred manner of carrying out the invention, the picker or blank for same is made by continuous fibrous webs being wound in such a manner that treated and raw layers alternate with each other in the wound body. This can be very simply effected and the picker can be produced from this wound body by heat and pressure with or without a mould and where necessary by subsequently further shaping under heat and pressure, or by machining, or by both of these methods. By the heat and pressure the artificial resin can also be hardened to the desired degree.

For example, by the coiling of a treated cloth web a coil is obtained which consists entirely of treated layers of cloth web and by the coiling of an untreated cloth web, a coil is obtained which consists entirely of raw or untreated layers of cloth. By the combined coiling of a treated and untreated web of cloth, a coil is obtained which consists of alternate layers of treated and untreated cloth. By the combined coiling of three or more webs, of which at least one is treated, the number of combinations can be increased.

In another manner of carrying out the invention, a coiled body is produced by the winding of a treated web of cloth and the placing thereon, at a certain point on its circumference, at every turn of the coil a strip of untreated cloth which is of such length that it only extends partly around the circumference. In this manner, a coiled body is obtained in which treated and untreated layers only alternate regularly with each other over a limited part of the coil whilst the rest of the coil consists only of treated layers. When this body is shaped to form a loom picker, one proceeds in this way that the striking face of the picker is formed by that part of the previously formed coil in which treated and untreated layers alternate, whilst the head of the picker in which the guide holes are made is formed from that part of the coiled body which consists entirely of treated layers.

In the accompanying drawings showing by way of illustration various embodiments of the invention, Fig. 1 is an edge view of a wound ring used in the manufacture of pickers of overpick looms, and Fig. 1a an enlarged longitudinal sectional view through one side of the ring, the section being taken along line 1a—1a in Fig. 1. Fig. 1b shows a diagrammatic view of the ring unwound in a reduced scale.

Figure 1:
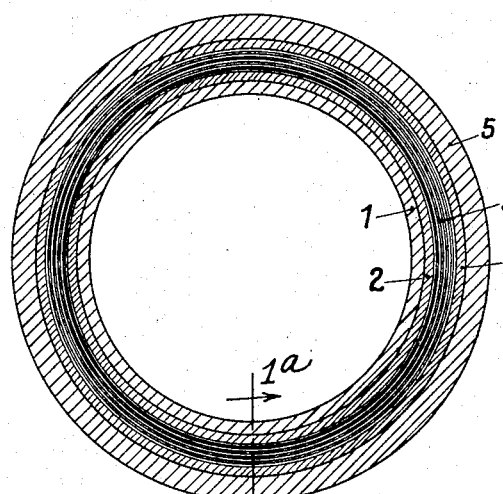

In the manufacture of the ring shown in Fig. 1, a web of cloth treated with a hardening artificial resin is first wound upon a mandrel of the same size as the internal diameter of the ring until a zone 1 is produced. Thereupon an untreated web is wound together with the treated web upon the zone 1 so that a zone 2 is produced in which treated and untreated layers alternate with each other. The treated web is then cut off and the untreated web wound still further to produce a zone 3 which contains only untreated layers. The untreated web is then further wound on together with a treated web until a zone 4 is produced in which treated and untreated layers again alternate with one another. Finally, the untreated web is severed and the treated web wound on alone to form the outer zone 5.

Preferably, the webs are heated during winding so that the artificial resin is in an adhesive condition.

Figure 1A:
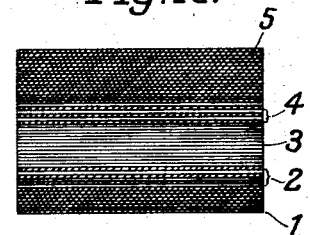

Fig. 1a shows diagrammatically a cross-section through a ring so made, the layers being shown enlarged and reduced in number for clearer illustration and the treated layers being indicated by hatching.

Figure 1B:
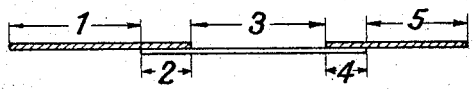

Figs. 1b shows the ring unwound. The numerals denote the zones which are formed by the corresponding parts of the web. The stretches 2 and 4 are considerably enlarged for clearer illustration.

Figure 2:
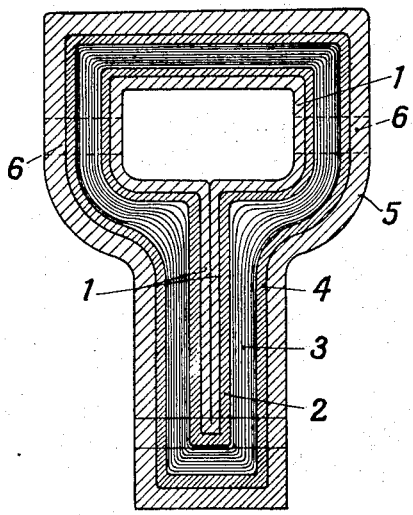
Figs. 2 and 3 are front and side views respectively of a picker constructed from the ring shown in Fig. 1.
Figure 3:
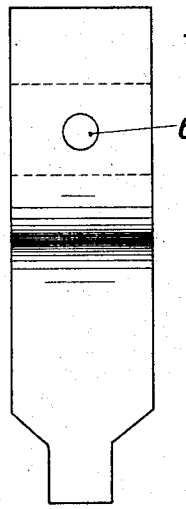

The ring so produced is shaped by pressure and heat and if necessary by mechanical treatment to form a picker as in Figs. 2 and 3, the artificial resin at the same time hardening. The zone 5 now constitutes a firm and hard outer skin which is well adapted to withstand the wear of the point of the shuttle. The zone 3 forms a soft bolster within the picker which substantially increases its durability. The zone 1 forms a backing or reinforcement for the bolster and at the same time protects the inner edges of the guide apertures 6 from breaking out. The zones 2 and 3 which only require to be a few layers in thickness serve mainly to provide a good and sure connection between the zone 3 and the zones 1 and 5.

Figure 4:
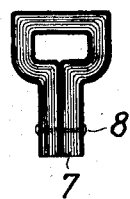
Fig. 4 is a front view of a modified picker.

In this construction the outer skin 5 united to a uniform mass by the artificial resin surrounds at all parts the core consisting of layers not provided with artificial resin and therefore not adhesively united, so that there is no danger of the layers opening out. Fig. 4, however, shows a construction in which the core 7 made of untreated layers extends to the edge at the foot of the picker. In this case therefore the opening out of the layers is prevented by rivets 8 which bind all the layers together.

Figures 5, 6:
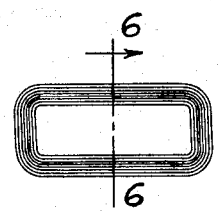
Figs. 5 and 6 are edge and sectional views respectively of a coiled body for producing a picker for underpick looms, the section of Fig. 6 being taken along line 6—6 in Fig. 5.

Figs. 5 and 6 show a substantially rectangular body or flattening ring which is produced by jointly winding a treated and untreated web upon a rectangular mandrel and which is subsequently pressed and heated and used as the element for a picker for underpick looms.

Figure 7:
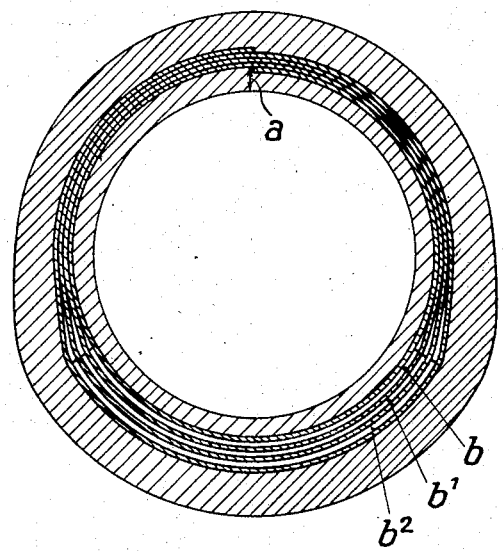
Fig. 7 is a sectional view of a modified construction of ring, taken in a plane rectangular to the axis of the ring.

In the manufacture of a ring as shown in Fig. 7, a single web of fibrous material impregnated with artificial resin is wound upon a mandrel of the same size as the internal diameter of the ring to be produced until a ring of the thickness $a$ is produced. A piece $b$ of untreated cloth is then laid on the ring and extends over about a third of the ring circumference, and the treated web is then wound on again over the piece b. After one turn of the treated web another untreated piece b' of the same length as before is laid on the ring and after winding on a further turn of the treated web, a third piece $b^2$ is placed on and held in place by winding on the treated web. Thereupon the rest of the treated web is wound on without any intermediate pieces until a ring is produed whose thickness over about a third of its circumference is somewhat larger by about the thickness of the three pieces b, b' and $b^2$. In the drawing the increased thickness is exaggerated for greater clearness.

When a picker as shown in Figs. 2 and 3 is produced from this ring, the head of the picker which has the guide apertures 6 is formed from that part of the ring which has no insertions, whilst the foot against which the shuttle strikes is made from that part which has the insertions b, b' and $b^2$.

I wish it to be understood that I do not desire to be limited to the exact details of construction shown and described, for obvious modifications will occur to a person skilled in the art In the claims affixed to this specification no selection of any particular modification of the invention is intended to the exclusion of other modifications thereof and the right to subsequently make claim to any modification not covered by these claims is expressly reserved.

I claim:

1. A picker for looms or similar article comprising untreated fibrous layers and fibrous layers treated with an artificial resin, the juxtaposed untreated and treated layers being firmly united by the said resin.

2. A picker for looms or similar article comprising untreated layers of textile cloth and layers of textile cloth treated with an artificial resin, said layers being united to form a laminated body in which the layers are caused to adhere together by means of the said resin.

3. A picker for looms or similar article comprising untreated layers of textile cloth and layers of textile cloth treated with an artificial resin, consisting of a phenol formaldehyde condensation product, all said layers being united to form a laminated body in which the layers are caused to adhere together by means of the said resin.

4. A blank for a loom picker consisting of a laminated body composed of untreated fibrous layers and fibrous layers treated with an artificial resin, said layers alternating with one another and being firmly united by the said resin.

5. A picker for looms or similar articles comprising outer and inner skins each consisting of laminated layers of fibrous material united by an artificial resin, and an inner portion consisting of alternating layers of untreated fibrous material and fibrous material treated with an artificial resin.

6. A picker for looms or similar article comprising outer and inner skins each composed of laminated layers of fibrous material united by an artificial resin, and an inner portion composed of a laminated core formed of untreated layers of fibrous material, and zones interposed between said core and inner and outer skins, each zone composed of alternating layers of untreated fibrous material and fibrous material treated with an artificial resin.

7. The method of manufacturing pickers for looms or similar articles which consists in winding a web of fibrous material treated with an artificial resin alternately with other webs to produce a laminated body, subjecting said body to heat and pressure to unite the laminæ, and shaping said body while under the said heat and pressure.

8. The method of manufacturing pickers for looms or similar articles which consists in winding webs of fibrous material treated with artificial resin and other webs together upon a mandrel, stripping the wound body from the mandrel, uniting the windings together by softening said resin, and shaping said body under heat and pressure.

9. The method of manufacturing pickers for looms or similar articles which consists in winding a web of fibrous material treated with artificial resin upon a mandrel, winding an untreated piece of fibrous material over a portion of said treated web, and repeating this procedure, then stripping the wound body from the mandrel, and finally shaping the body under heat and pressure.

10. A picker for looms or similar article comprising a striking portion formed entirely of laminæ of untreated fibrous layers and fibrous layers treated with an artificial resin, and a head portion composed of layers of fibrous material treated with artificial resin.

In testimony whereof I affix my signature.

VALENTIN WEISS.